United States Patent [19]
Street et al.

[11] Patent Number: 5,398,744
[45] Date of Patent: Mar. 21, 1995

[54] TIRE PRESSURE REGULATING APPARATUS

[76] Inventors: Brian R. Street, 5 Fern Close, Alderholt, Fordingbridge, Hampshire, SP6 3HZ; Christopher J. Sawyer, 85 Uplands, Stevenage, Hertfordshire SG2 7DW, both of United Kingdom

[21] Appl. No.: 76,435

[22] Filed: Jun. 11, 1993

[30] Foreign Application Priority Data

Jun. 17, 1992 [GB] United Kingdom ............... 9212814.9

[51] Int. Cl.6 ............................................. B60C 29/04
[52] U.S. Cl. ................................. 152/429; 152/427; 152/415; 152/431; 137/230; 137/523
[58] Field of Search ............... 152/415, 427, 429, 431; 137/226, 230, 523

[56] References Cited

U.S. PATENT DOCUMENTS

| | | | |
|---|---|---|---|
| 1,179,668 | 4/1916 | Shewmaker | 137/230 |
| 1,481,551 | 1/1924 | Hammond et al. | 137/230 |
| 1,508,984 | 9/1924 | Myers | 137/523 |
| 1,563,871 | 12/1925 | Roller | 152/431 |
| 1,696,211 | 12/1928 | Preisser | 152/429 |
| 2,987,071 | 6/1961 | Haus | 137/230 |
| 3,419,040 | 12/1968 | Thibodeaux | 137/523 |
| 3,536,117 | 10/1970 | Huber | 152/427 X |
| 4,681,148 | 7/1987 | Decker, Jr. et al. | 152/431 |
| 4,708,169 | 11/1987 | Liu | 137/230 X |
| 5,096,158 | 5/1992 | Burdick et al. | 251/904 X |

FOREIGN PATENT DOCUMENTS 482523 7/1953 Italy.

*Primary Examiner*—Michael W. Ball
*Assistant Examiner*—Francis J. Lorin

[57] ABSTRACT

Apparatus for use in co-operation with a conventional tire inflation valve which enables the pressure in a tire to be reduced to a pre-determined value in a one step process. A movable pressure regulator member, comprising a pin and slot arrangement, co-operates with a valve regulating spring to close a valve member, once the pressure in the tire has reached the required valve.

8 Claims, 2 Drawing Sheets

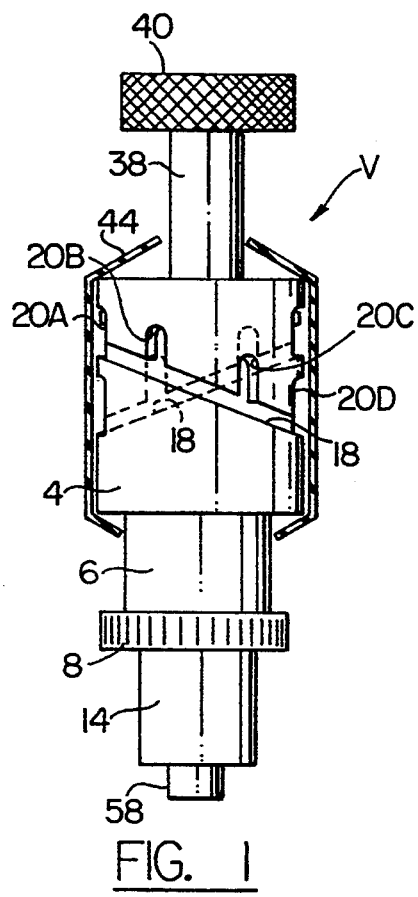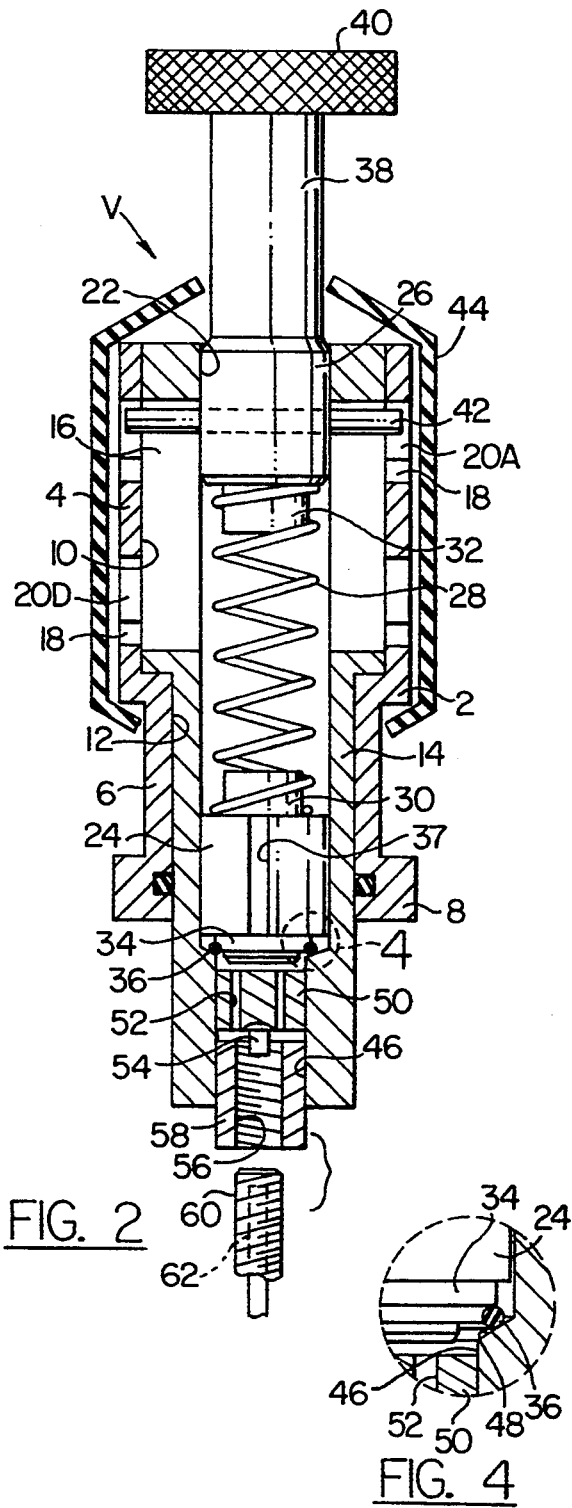

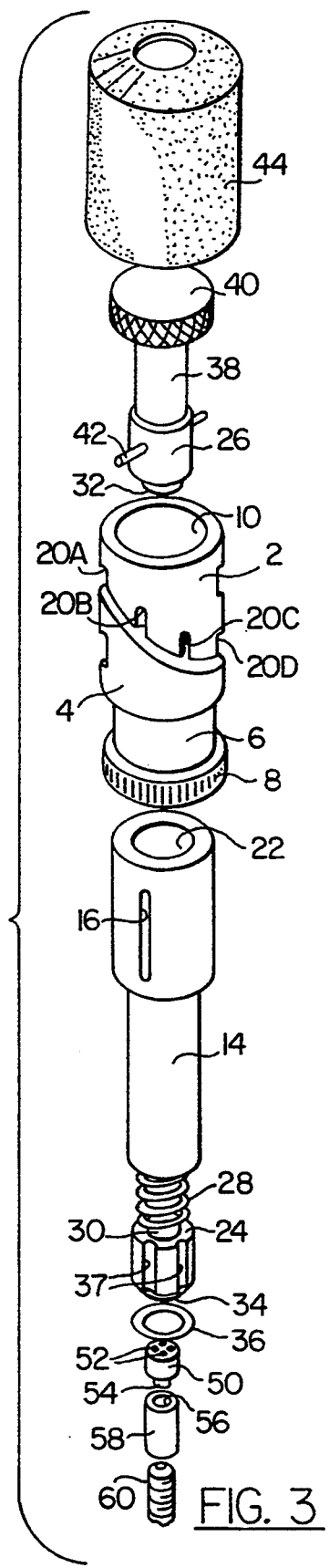
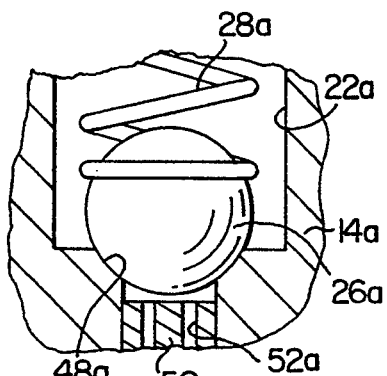
FIG. 3
FIG. 5

TIRE PRESSURE REGULATING APPARATUS

BACKGROUND OF THE INVENTION

This invention relates to pressure regulating apparatus for use with vehicle tires and particularly to a pressure regulator which can be set to regulate the pressure in the vehicle tire by adjusting the biasing force of a spring which urges a valve member to close an inlet port from a pressure source.

It is known to provide a valve mechanism wherein a spring, which normally biases a closure member towards a valve seating, is adjustable to regulate the pressure passing into the valve through an air inlet port. Such adjustment may be made by means of a screw threaded into part of the valve housing and acting on one end of the spring. Rotation of the screw in one direction or another thus increases or decreases the biasing force of the spring.

Such pressure regulators are disclosed in British patent specifications numbers 1567402, 138694, 336624, 384760, 1580240 and U.S. Pat. Nos. 2,690,757, 2,987,071, 4,869,306 and 4,883,107.

It is also known from British patent specification 8172/1910 to provide a spring biased pressure relief valve wherein the spring is located between a bridging member and the valve head, and where the biasing force of the spring is adjustable by moving the bridge member upwardly or downwardly with respect to the spring. The bridging member locates in slots in the valve housing and is secured in its desired position by means of nuts.

British patent specification 2215438-A shows a spring biased relief valve wherein a pin extends transversely form a plunger which is in engagement with the spring and the pin is engaged by a rotary camming face formed in part of the valve housing. Rotation of the plunger causes a camming action on the plunger to adjust the biasing force of the spring.

In all the above patent specifications the adjustment of the tire pressure is a slow operation.

There is, however, a need particularly in the case of military vehicles, e.g. personnel carriers operating in desert conditions or other soft or boggy terrain to be able to adjust the tire pressure downwardly with a great degree of urgency and accuracy.

In some circumstances a vehicle may suddenly arrive at an area of such difficult terrain and it is important to be able to either advance or withdraw without undue delay. Thus, in order to combat the effect of the ground conditions, there is a need to quickly lower the tire pressure in order to provide a "footprint" of larger area to increase the traction of the vehicle.

SUMMARY OF THE INVENTION

Accordingly, a general object of the invention is to provide improvement is in one or more of these respects, or generally.

In an embodiment of the invention there is provided tire pressure control apparatus for use in co-operation with a vehicle tire inflation valve wherein a movable pressure regulator member is adapted to cooperate with a valve-regulating spring member to provide at least two spaced positions of said pressure regulator member corresponding to respective differing pressures in the tire, between which positions said pressure regulator member can be shifted in one step.

The pressure regulator member may comprise adjustable pin and slot means which enables variation of compression of the valve-regulating spring member. The use of pin and slot means enables adjustment of the tire pressure between two pre-determined values to be effected both quickly and accurately.

In an embodiment the pin means are rotatable about an axis parallel to the longitudinal axis of the vehicle tire inflation valve. In this embodiment the pin means may be located on the pressure regulator member and the slot means may be located on co-operating sleeve means.

In a further embodiment of the invention there is provided tire pressure regulating apparatus including a housing comprising an outer sleeve having a first end portion and a second end portion, an inner sleeve member located within a pair of axial bores formed in the outer sleeve, the inner sleeve member extending axially between a first end and a second end and having a pressure chamber in communication with a pressure inlet port, pressure inlet valve means having passageways capable of connecting the pressure inlet port with atmosphere, a spring member adapted to urge the pressure inlet valve means into sealing relationship with a seating formed on the pressure inlet port, the spring member locating at one end with the pressure inlet valve means and at the other end with a pressure regulator member, the valve means, the spring member and the pressure regulator member being axially movable within an axial bore formed in the inner sleeve member, the inner sleeve member being further provided with longitudinally extending slots, the outer sleeve being formed with helical slots at its periphery and a plurality of recesses connecting with those slots, the pressure regulator member having a radially extending pin passing through the longitudinally extending slots in the inner sleeve member and into the helical slots and recesses in the outer sleeve, a screw plug affixed within a bore at the second end of the inner sleeve member and adapted to be screwed on to a stem of a conventional vehicle tire valve; a stationary plug having passageways formed thereon or therethrough and affixed within the bore in the second end of the inner member, the stationary plug having a tire valve stem depressing nipple depending axially therefrom, whereby the biasing force of the spring may be adjusted by locating the radially extending pin in the pressure regulator member in a desired recess formed in the outer sleeve member.

BRIEF DESCRIPTION OF THE DRAWINGS

The above object and features of the invention will become clear from the following description which is given by way of example only with reference to the accompanying drawings in which:

FIG. 1 is a side elevation with part shown in section of a tire pressure regulating apparatus according to an embodiment the invention, FIG. 2 is a longitudinal section view through the tire pressure regulating apparatus of FIG. 1, and FIG. 3 is an exploded perspective view of the component parts of the apparatus.

FIG. 4 is a somewhat enlarged fragmentary sectional view of the apparatus shown in FIG. 2.

FIG. 5 is similar to FIG. 4 but shows another embodiment of the invention.

DESCRIPTION OF PREFERRED EMBODIMENTS

Referring to the drawings a control apparatus V as oriented in the drawings comprises a cylindrical housing 2 having a upper portion a lower portion of reduced diameter 6. A knurled head 8 is provided at one end of the housing. The portion 4 is formed with a bore 10 and the portion 6 is formed with a bore 12. An inner sleeve 14, formed with longitudinal slots 16 is freely rotatable within the housing 2.

The housing 2 is provided at its periphery with a pair of diametrically opposed helical slots 18, and a number of short recesses 20A, 20B, 20C and 20D extend from the helical slots in the direction parallel to the axis of the housing.

Slidably located within a bore 22 formed in the inner sleeve 14 are spring seats 24 and 26, and a pressure regulator member a compression spring 28 is fitted therebetween around spigots 30, 32.

The inlet valve 24 is formed at its lower end with a further short spigot 34 which is grooved to retain an O-ring 36, and passageways 37 are provided on its periphery.

The regulator member 26 has a cylindrical extension 38 which terminates as a head 40, and a pin 42 extends radially from the regulator member 26 to pass freely through each of the slots 16 and into the helical grooves 18 or one of the sets of dramatically opposing adjustment recesses 20A, 20B, 20C or 20D.

A rubber boot 44 envelopes part of the housing 2 in order to preclude ingress of foreign material e.g. road grime, sand or water.

The lower end portion of the inner sleeve 14 is formed with a bore 46 or pressure inlet port and a valve seat 48 against which the O-ring 36 locates during sealing operation of the valve.

A plug 50 having passageways 52 formed therein is shrink fitted into the bore 46 and has an axially projecting nipple 54 which extends into a screw threaded hole 56 in a further plug 58 which is also a tight fit in the lower portion of the bore 46.

In use, a vehicle tire is first inflated to its maximum pressure after which the control apparatus V is secured thereto by screwing the plug 58 on to the valve stem 60 of the road wheels so that the nipple 54 depresses the conventional tire pressure relief valve rod 62 to allow the air within the tire to escape through the valve stem 60. The air passes under pressure through the passages 52 in the plug 50 and acts on the lower face of the inlet valve 24 to urge that valve to seat against the biasing effect of the spring 28. Clearly, when the biasing force of the spring is equivalent to the pressure within the tire the inlet valve will remain in its operative position with the O-ring firmly compressed against the seat 48. When the pressure in the tire exceeds the biasing force of the spring then the inlet valve and its O-ring is lifted off of the valve seat 48 so that air under pressure escapes through passageways 37 and thence through the bore 22, slots 16 in the inner sleeve and helical slots 18 and recesses 20 to finally pass between the boot 44 and its contact points with the body 2 of the control apparatus.

In order to maintain the tire at its normal maximum recommended pressure the spring 28 is selected to provide a biasing force at least equal to the effect of that pressure. Initially the head 40 is manually depressed in order to move the pin 42 out of its engaging recess 20 and into the helical slot 18. Further downward pressure applied to the head 40 causes the pin 42 to cooperate with the slots 18 until it reaches the limit of the extent of the slot when manual pressure on the head is relaxed to enable the pin to be located in the lowermost recess 20D. The biasing force of the spring is then at its greatest and the vehicle is used in the normal manner whilst it operates under normal road surface conditions. When the surface conditions change such that a rapid increases in the size of the "footprint" of the tire is needed to allow the vehicle to have sufficient traction and low enough ground pressure to continue proceeding, the vehicle is preferably, but not necessarily stopped and then each of the units V is adjusted rapidly to allow air to escape from the respective tires.

Thus, the head 40 of each unit in turn is depressed to move the ends of the pin 42 from its engaging recess 20D into the helical slot 18 after which further downward pressure on the head 40 causes the housing 2 to rotate about the inner sleeve 14 until the pin aligns with the recess 20C, 20B, 20A as required to reduce the air pressure in the tires to the equivalent of the biasing force of the spring, so adjusted.

It is found that such adjustment can be rapidly and accurately effected by the use of the valve of the invention.

The vehicle may remain stationary to allow the tire pressure to stabilise, or may be driven whilst the pressure reduces towards the stabilised level selected.

In order that loss of tire pressure does not occur due to the effect of an unduly bumpy road surface or terrain, the unit V may be unscrewed and removed from the Schraeder valves on the road wheels. Thus, sudden jolts which would otherwise have temporarily increased the tire pressures above that preset by the spring are made ineffective. The units would of course be replaced when their use again becomes expedient.

We claim:

1. Tire pressure regulating apparatus including a housing having an upper end portion and a lower end portion, an inner sleeve member located within a pair of axial bores of differing diameters formed in the housing, the inner sleeve member extending axially between the upper end portion and the lower end portion and having a sleeve bore in communication with a pressure inlet port in the lower end portion thereof, a pressure inlet valve having passageways for connecting the pressure inlet port with atmosphere, a spring member adapted to urge the pressure inlet valve into sealing relationship with a valve seat formed on the pressure inlet port, the spring member locating at one end with the pressure valve and at the other end with a pressure regulator member, the pressure inlet valve, the spring member and the pressure regulator member being axially movable within the sleeve bore, characterised in that the inner sleeve member being further provided with longitudinally extending slots, the housing being formed with regulating slot means including helical slots at its periphery and a plurality of recesses connecting with the helical slots for defining a plurality of discrete fixed positions of adjustment of the regulator member corresponding to respective differing pressures in a tire, the pressure regulator member having a radially extending pin passing through the longitudinally extending slots in the inner sleeve member and projecting into the regulating slot means in the for cooperating with said recesses to releasably retain the regulator member in a desired one of the discrete positions of adjustment and, a screw plug affixed within a bore at the second end of the inner sleeve member and adapted to be screwed on to a stem of a conventional vehicle tire valve; a stationary plug having passageways therethrough and affixed within the bore in the second end of the inner member, the stationary plug having a tire valve stem depressing nipple depending axially therefrom, whereby the biasing force of the spring may be adjusted by locating the regulator member in a desired one of the discrete fixed positions of adjustment.

2. Tire pressure regulating apparatus according to claim 1 characterised in that said pressure inlet valve means comprises a ball valve.

3. In combination with a valved tire, tire pressure regulating apparatus according to claim 1.

4. A method of controlling the pressure in a tire using apparatus according to claim 1 characterised by the step of moving said pressure regulator member between said discrete positions in one step.

5. Tire pressure regulating apparatus including a cylindrical housing having upper and lower ends and a stepped housing bore extending coaxially therethrough, an inner sleeve extending through and substantially complementing said housing bore and having a coaxial sleeve bore opening through its upper end and a pressure inlet port in the lower end portion thereof communicating with said sleeve bore and opening outwardly through said lower end portion, said inlet port having a valve seat at its inner end, a pressure inlet valve disposed within said sleeve bore for seating engagement with said valve seat, a generally cylindrical pressure regulator member coaxially supported within the upper end portion of said sleeve bore and projecting outwardly therefrom, a spring member located in said sleeve bore and acting between said pressure regulator member and said pressure inlet valve and biasing said pressure inlet valve into sealing relationship with said valve seat, means for releasably securing said pressure regulating apparatus to an associated valve stem on a tire with said valve stem in communication with said inlet passageway, and means for maintaining the pressure relief valve rod in the valve stem depressed position to allow air within the tire to escape through the valve stem and into the inlet passageway, further characterized in that the inner sleeve member has diametrically opposed slots opening radially outwardly therethrough communicating with said sleeve bore and extending in axial directions and said housing has regulating slot means formed therein including helical slots at its periphery and a plurality of recesses communicating with the helical slots for defining a plurality of discrete fixed positions of adjustment of the pressure regulator member corresponding to respective differing pressures in a tire, and a pin carried by the pressure regulator member and having radially outwardly extending end portions passing through the slots in the inner sleeve member and projecting into the regulating slot means in the housing for cooperating with said recesses to releasably retain the pressure regulator member in a desired one of said discrete fixed positions of adjustment.

6. In combination with a valved tire, tire pressure control apparatus according to claim 5.

7. A method of controlling the pressure in a tire using apparatus according to claim 5 characterised by the step of moving said pressure regulator member between said discrete positions in one step.

8. Tire pressure regulating apparatus as set forth in claim 5 wherein said pressure inlet valve means comprises a ball valve.

* * * * *